United States Patent [19]
Onishi

[11] Patent Number: 5,293,956
[45] Date of Patent: Mar. 15, 1994

[54] FOUR WHEEL DRIVE WORKING VEHICLE
[75] Inventor: Naoki Onishi, Sakai, Japan
[73] Assignee: Kubota Corporation, Osaka, Japan
[21] Appl. No.: 909,623
[22] Filed: Jul. 7, 1992
[30] Foreign Application Priority Data Jul. 11, 1991 [JP] Japan .................................. 3-170773
Mar. 17, 1992 [JP] Japan .................................. 4-0585594

[51] Int. Cl.⁵ ...................... B60K 17/34; B62D 11/02
[52] U.S. Cl. .................................. 180/233; 180/244; 180/247
[58] Field of Search ................ 180/233, 247, 248, 244

[56] References Cited
U.S. PATENT DOCUMENTS

| 4,669,559 | 6/1987 | Fukui | 180/233 |
| 4,723,622 | 2/1988 | Toshkuni et al. | 180/233 |
| 4,723,623 | 2/1988 | Teraoka | 180/233 |
| 4,792,009 | 12/1988 | Iritani | 180/233 |

Primary Examiner—Mitchell J. Hill
Attorney, Agent, or Firm—Gifford, Groh, Sprinkle, Patmore and Anderson

[57] ABSTRACT

A four wheel drive working vehicle having a front wheel transmission switchable between a standard position for driving front wheels at substantially the same speed as rear wheels, and an accelerating position for driving the front wheels at a higher speed than the rear wheels; right and left side brakes for acting on the right and left rear wheels, respectively; a control device for switching the front wheel transmission from the standard position to the accelerating position when the front wheels are steered in excess of a first predetermined angle rightward or leftward from a straight running position, and for operating one of the right and left side brakes inwardly with respect to turning of the vehicle when the front wheels are steered in excess of a second predetermined angle rightward or leftward from the straight running position; and a governor for governing operation of the control device in response to a running speed of the vehicle. The governor is operable to prohibit control of the front wheel transmission and side brakes when a propelling transmission is set to a high speed position, to allow control of the front wheel transmission and prohibit control of the side brakes when the propelling transmission is set to an intermediate speed position, and to allow control of the front wheel transmission and side brakes when the propelling transmission is set to a low speed position.

6 Claims, 11 Drawing Sheets

| AUX. TRANSMISSION | FRONT WHEEL ACCELERATION | SIDE BRAKE OPERATION |
|---|---|---|
| LOW SPEED | YES | YES |
| INTERMEDIATE SPEED | YES | NO |
| HIGH SPEED | NO | NO |

FIG.11

FOUR WHEEL DRIVE WORKING VEHICLE

BACKGROUND OF THE INVENTION

The present invention relates to a four wheel drive working vehicle comprising right and left front wheels, and right and left rear wheels; a propelling transmission for outputting variable drive to the front and rear wheels; a front wheel transmission disposed between the front wheels and the propelling transmission, the front wheel transmission including a switching actuator for switching the front wheel transmission between a standard position for driving the front wheels at substantially the same speed as the rear wheels, and an accelerating position for driving the front wheels at a higher speed than the rear wheels; right and left side brakes for acting on the right and left rear wheels, respectively; right and left actuators for driving the right and left side brakes, respectively; a steering device for steering the front wheels; a control device for controlling the switching actuator and the right and left actuators; and an interlocking device for transmitting a displacement of the steering device to the control device.

A four wheel drive working vehicle of the type noted above is capable of driving the front wheels at a higher peripheral speed than the rear wheels and operating one of the side brakes when a steering angle of the front wheels exceeds a predetermined value. Such a vehicle is known from Japanese Patent Publication Kokai No. 1990-175331, for example. The prior vehicle has hydraulic actuators mounted in a control system for operating the respective side brakes, and an electromagnetic valve mounted on an oil line branched from an oil supply line to a front wheel accelerating mechanism. The electromagnetic valve is switchable based on detection by a detecting switch for detecting a steering operation exceeding the predetermined value, to drive the hydraulic actuator connected to an inward one of the side brakes with respect to turning of the vehicle. This actuates the front wheel accelerating mechanism and brakes the inward rear wheel to enable a small, sharp turn of the vehicle. The driver need not depress a brake pedal to brake the inward rear wheel at this time.

However, the conventional construction requires, in addition to the control system for the front wheel accelerating mechanism, the detecting device and the oil line switching valve specially for detecting steering angles and operating the respective side brakes. Thus, the conventional construction is complicated with a large number of components.

SUMMARY OF THE INVENTION

The object of the present invention is to provide a four wheel drive vehicle with a simple autobrake system operable, in response to a steering operation of the front wheels, for allowing the front wheels to be driven faster than the rear wheels, and automatically applying one of the side brakes.

The above object is fulfilled, according to one aspect of the present invention, by a four wheel drive working vehicle as described in the outset hereof, wherein the control device comprises one hydraulic control valve, the interlocking device comprises a displacement transmitting member for transmitting a displacement of the steering device to a spool of the hydraulic control valve, and wherein the control valve is operable, in response to a displacement of the steering device exceeding a first set angle, to switch the front wheel transmission from the standard position to the accelerating position, and in response to a further displacement of the steering device exceeding a second set angle, to control one of the right and left actuators to drive one of the right and left side brakes inwardly with respect to turning of the working vehicle.

The above construction is simple in that it requires no detecting mechanism to detect a displacement for operating the side brakes in addition to a steering angle detecting mechanism for accelerating the front wheels. Operation of the side brakes is automatically interlocked to turning of a steering wheel. Only a steering operation causes the front wheels to be accelerated and the rear wheel inwardly with respect to turning of the vehicle to be braked.

A further aspect of the invention, the control device includes a first control unit for controlling the front wheel transmission, and a second control unit for controlling the right and left actuators, the first control unit being operable, in response to a displacement of the steering device exceeding a first set angle, to switch the front wheel transmission from the standard position to the accelerating position, the second control unit being operable, in response to a further displacement of the steering device exceeding a second set angle, to control one of the right and left actuators to drive one of the right and left side brakes inwardly with respect to turning of the working vehicle. This vehicle also has a governor for governing operation of the control device. The governor includes a first governor section for prohibiting operation of the first and second control units when the propelling transmission is set to a high speed position, a second governor section for allowing operation of the first control unit and prohibiting operation of the second control unit when the propelling transmission is set to an intermediate speed position, and a third governor section for allowing operation of the first and second control units when the propelling transmission is set to a low speed position.

According to this construction, when the driver sets the propelling transmission to a high speed range (corresponding to a high speed run of the vehicle) not requiring a small, sharp turn of the vehicle, the front wheel transmission is not switchable from the standard position to the accelerating position, nor is the side brake inwardly with respect to turning of the vehicle operable. Conversely, when the driver sets the propelling transmission to a low speed range (corresponding to a low speed run of the vehicle), the front wheel transmission is switchable from the standard position to the accelerating position, and the side brake inwardly with respect to turning of the vehicle is operable. Consequently, the vehicle is capable of making a very small, sharp turn at a low speed, by a pulling action in a turning direction of the front wheels accelerated by the front wheel transmission, and a braking action applied to the inward rear wheel. In this way, a change speed operation by the driver automatically results in a switch between a state to prohibit operation of both the front wheel transmission and side brakes (a high speed running state), and a state to allow operation thereof (a low speed running state).

When the driver sets the propelling transmission to an intermediate speed range (corresponding to an intermediate speed run of the vehicle), the front wheel transmission is switchable from the standard position to the accelerating position, but the side brake inwardly with respect to turning of the vehicle is not operable. Compared with a turn made only by using one of the side brakes, a turn made only by using the front wheel transmission may be small and smooth and does not injure the ground since all the four wheels are driven and the accelerated front wheels exert pulling action in a turning direction. Where a turn is made only by using one of the side brakes, the rear wheel inward with respect to the turning is substantially stopped. Thus, a smaller turn may be made centering on the inward rear wheel than when only the front wheel transmission is used. However, the braked rear wheel is often dragged to injure the ground.

When the propelling transmission is set to the intermediate speed range, a turn made by using only the front wheel transmission to accelerate the front wheels is preferable to a turn made by using one of the side brakes, since the former is not excessively sharp and does not injure the ground. The present invention provides improved maneuverability in that the front wheel transmission is automatically operated and the side brakes switched to an inoperable state in response to a change speed operation by the driver.

Other features and advantages of the present invention will be apparent from the following description of the preferred embodiment taken with reference to the drawings.

DETAILED DESCRIPTION OF THE PREFERRED EMBODIMENT

Figure 1:
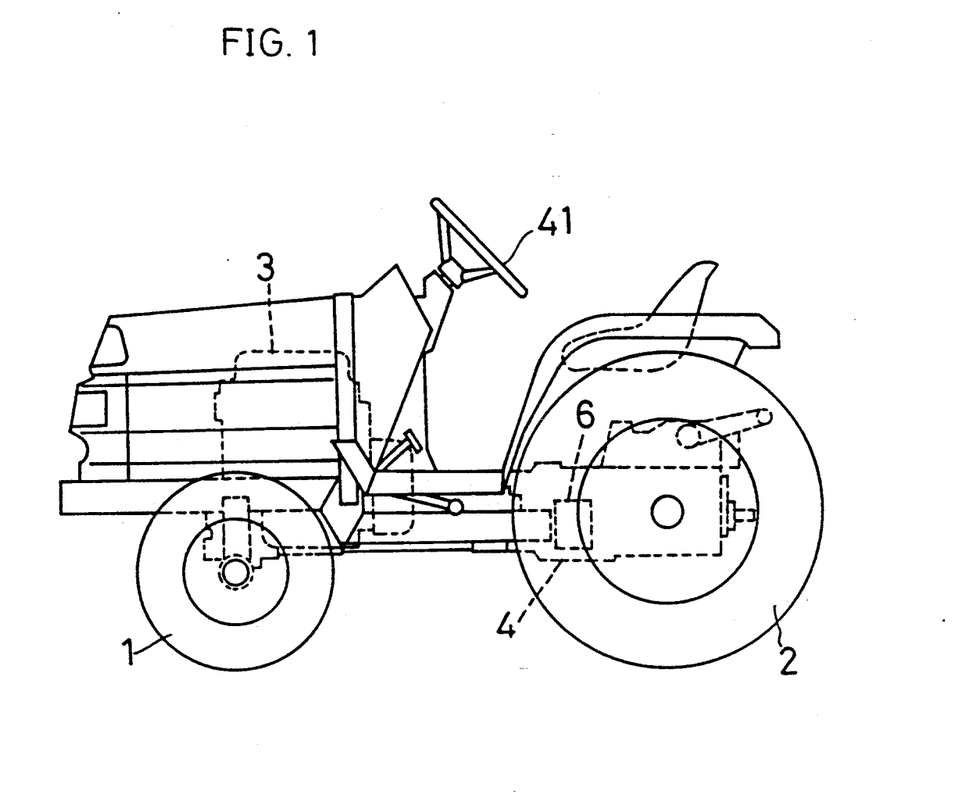
FIG. 1 is a side elevation of a four wheel drive tractor according to the present invention.

An embodiment of the present invention will be described hereinafter with reference to the drawings. FIG. 1 shows a tractor as one example of four wheel drive working vehicles, which comprises right and left front wheels 1 and right and left rear wheels 2 supporting a chassis. An engine 3 is mounted on a forward position of the chassis, and a transmission case 4 mounted rearwardly thereof.

Figure 2:
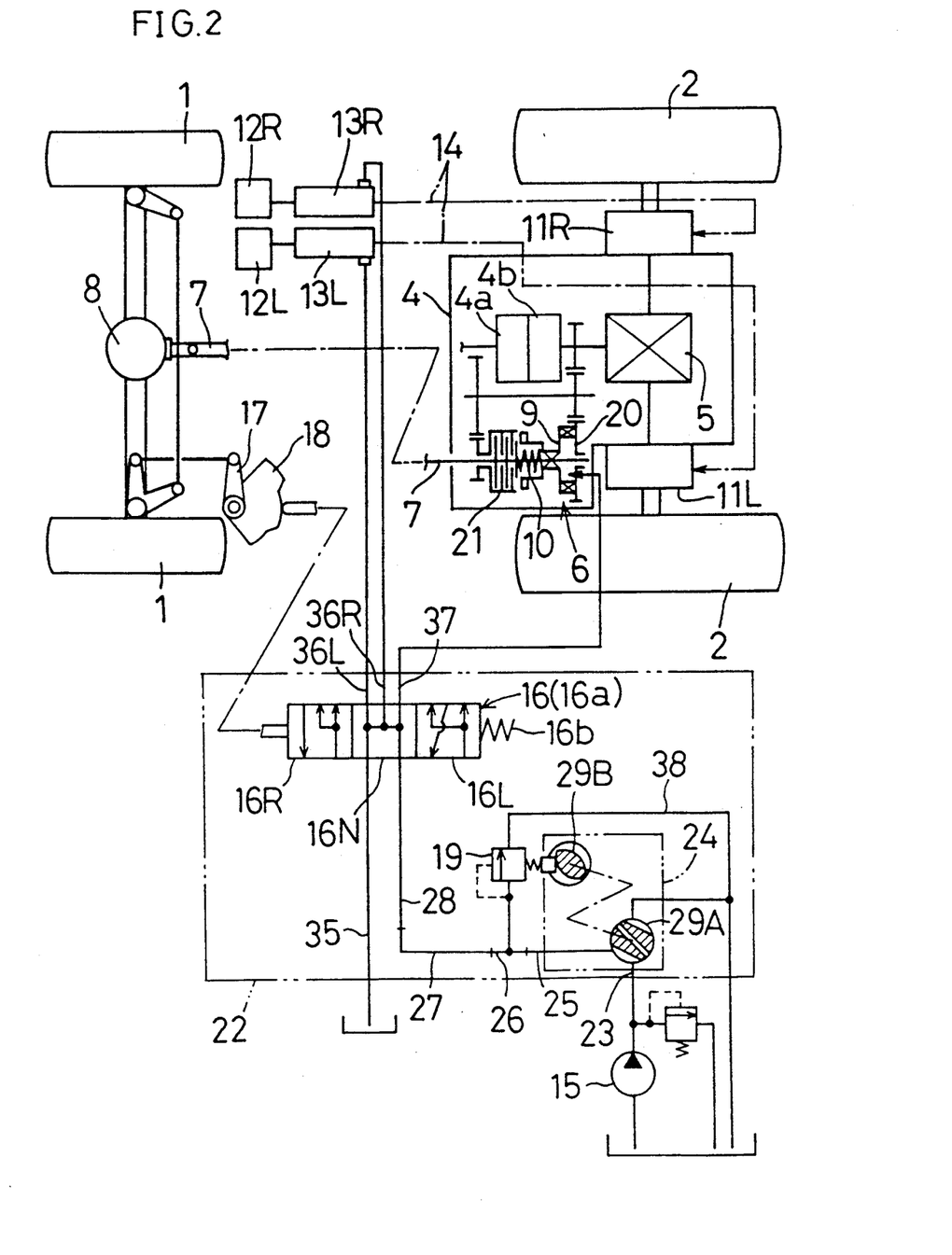
FIG. 2 is a circuit diagram showing an interlocking arrangement of right and left side brakes, a front wheel transmission, a control valve, a changeover valve and a pressure governor valve.

As shown in FIG. 2, power of the engine 3 is transmitted to the right and left rear wheels 2 through a main transmission (of the multistage change speed gearing type) 4a and an auxiliary transmission (of the three stage change speed gearing type to provide high, intermediate and low speeds) 4b mounted in the transmission case 4, and a rear differential 5. Power is branched off immediately upstream of the rear differential 5 to be transmitted to the right and left front wheels 1 through a front wheel transmission 6, a front wheel output shaft 7 and a front differential 8. The front wheel transmission 6 is switchable between a standard position to drive the front wheels 1 at substantially the same speed as the rear wheels 2, and an accelerating position to drive the front wheels 1 at a higher speed than the rear wheels 2. As shown in FIG. 2, a shift member 9 for switching the front wheel transmission 6 between the two positions is biased by a spring 10 toward a standard gear 20. Normally the shift member 9 is engaged with the standard gear 10 to place the front wheel transmission 6 in the standard position. The shift member 9 is slidable leftward in FIG. 2 to push and engage a friction clutch 21 when pressure oil is supplied to an oil chamber (not shown) defined between the shift member 9 and the standard gear 20, thereby placing the front wheel transmission 6 in the accelerating position.

Figure 11:
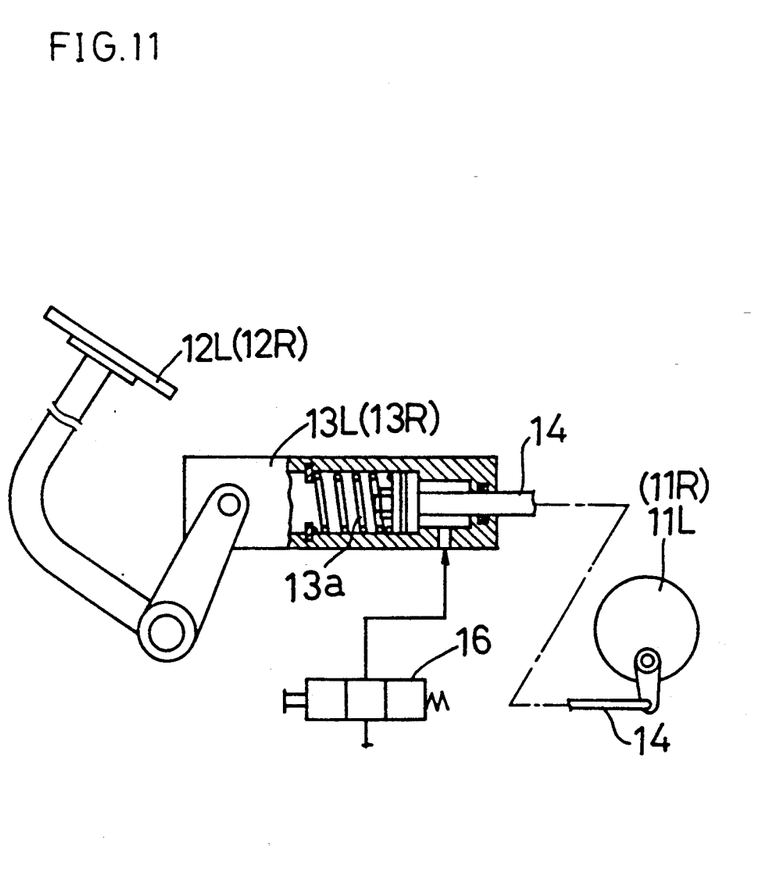
FIG. 11 is a side view in vertical section of one of the side brakes, a brake pedal, and a cylinder interconnecting the side brake and pedal.

As shown in FIG. 2, side brakes 11R and 11L are provided to brake the right and left rear wheels 2 independently of each other. As shown in FIGS. 2 and 11, a pair of right and left side brake pedals 12R and 12L is disposed on a righthand side of a floor of a driver's section. The right and left side brakes 11R and 11L are interlocked to these pedals 12R and 12L through cylinders 13R and 13L and connecting rods 14, respectively.

According to the above construction, the right and left side brakes 11R and 11L are independently operable by depressing the right and left side brake pedals 12R and 12L, respectively. As shown in FIG. 11, each of the cylinders 13R and 13L is biased toward an extended position by a spring 13a, and is contractible by pressure oil supplied thereto to operate the side brake 11R or 11L.

Figure 3:
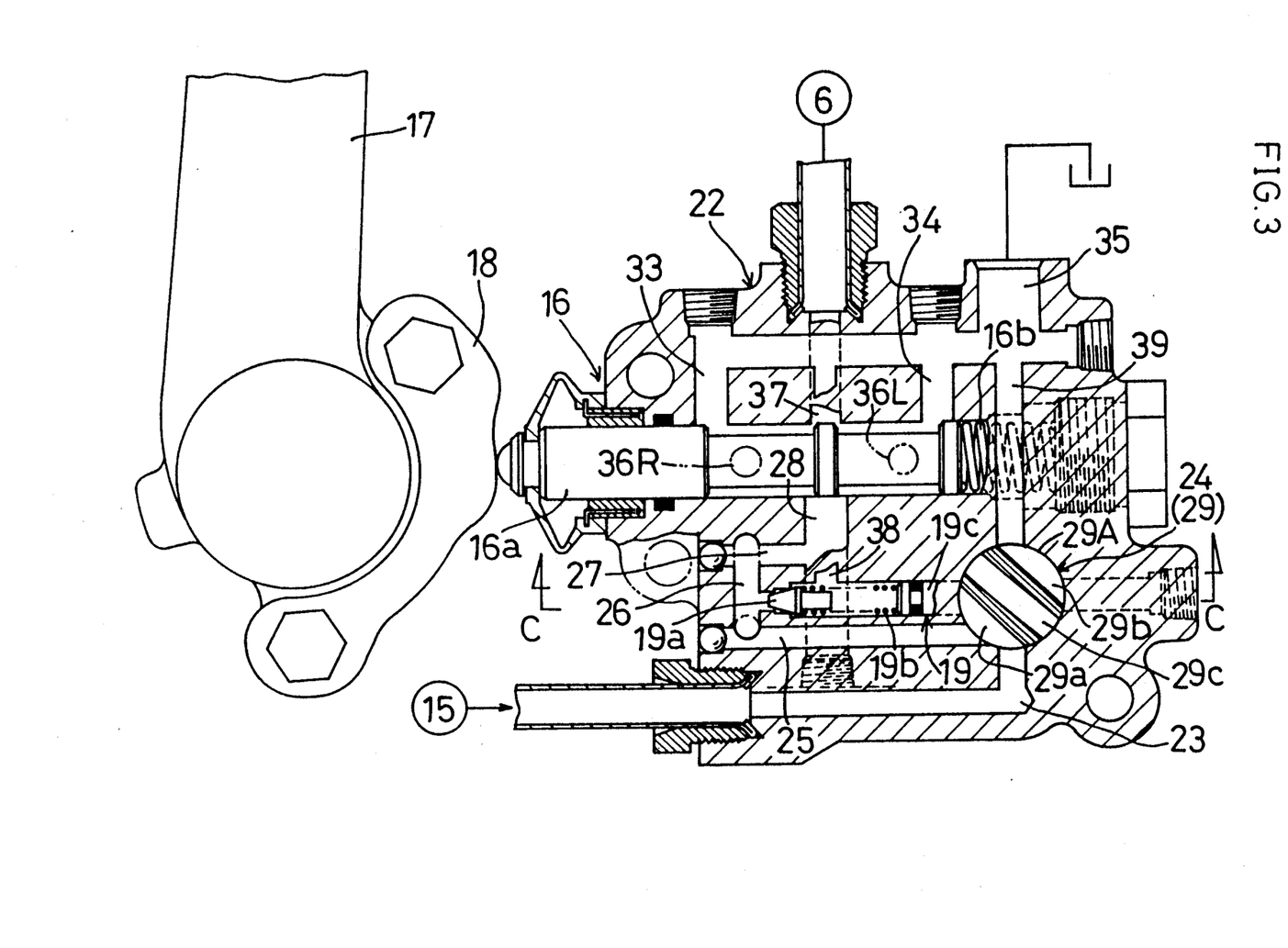
FIG. 3 is a side view in vertical section of a valve unit containing the control valve, changeover valve and pressure governor valve.

The way in which a steering operation of the front wheels 1 is interlocked to the side brakes 11R and 11L and front wheel transmission 6 will be described next. As shown in FIGS. 2 and 3, pressure oil is supplied from a pump 15 to the right and left cylinders 13R and 13L and front wheel transmission 6 through an oil line 28 and a control valve 16 disposed in a block-shaped valve unit 22. The control valve 16 is a three position valve having a straight run position 16N, a right turn position 16R and a left turn position 16L. In the straight run position 16N, the control valve 16 drains pressure oil from the oil chamber defined between the shift member 9 and standard gear 20 of the front wheel transmission 6, and from the right and left cylinders 13R and 13L. In the right turn position 16R, the control valve 16 supplies pressure oil from the pump 15 to the oil chamber of the front wheel transmission 6 and to the right cylinder 13R, and drains pressure oil from the left cylinder 13L. In the left turn position 16L, the control valve 16 supplies pressure oil from the pump 15 to the oil chamber of the front wheel transmission 6 and to the left cylinder 13L, and drains pressure oil from the right cylinder 13R.

As shown in FIGS. 2 and 3, a pitman arm 17 for steering the front wheels 1 has a cam plate 18 fixed thereto. The control valve 16 has a spool 16a for contacting the cam plate 18, and a spring 16b for biasing the spool 16a into contact with the cam plate 18. FIGS. 2 and 3 show the front wheels 1 in a position to run straight, with the control valve 16 in the straight run position 16N. In this position, the pressure oil flowing from the oil line 28 is drained through drain lines 33 and 34 and a drain 35. Consequently, the shift member 9 is engaged with the standard gear 20 of the front wheel transmission 6, with the right and left side brakes 11R and 11L in a non-braking state, to produce the standard position to drive the front wheels 1 at substantially the same speed as the rear wheels 2.

When the front wheels 1 are steered in excess of a predetermined angle rightward from the position shown in FIGS. 2 and 3, the cam plate 18 pushes the spool 16a of the control valve 16 rightward in the drawings, to place the control valve 16 in the right turn position 16R. Pressure oil now flows from the oil line 28 through a right brake port 36R to the right cylinder 13R, and through a front wheel transmission port 37 to the front wheel transmission 6. As a result, the friction clutch 21 of the front wheel transmission 6 is engaged to produce the accelerating position to drive the front wheels 1 faster than the rear wheels 2, with the right cylinder 13R contracted to operate the right side brake 11R.

Conversely, when the front wheels 1 are steered in excess of the predetermined angle leftward from the position shown in FIGS. 2 and 3, the spool 16a of the control valve 16 moves leftward in the drawings, to place the control valve 16 in the left turn position 16L. Pressure oil now flows from the oil line 28 through a left brake port 36L to the left cylinder 13L, and through the front wheel transmission port 37 to the front wheel transmission 6. As a result, the friction clutch 21 of the front wheel transmission 6 is engaged to produce the accelerating position to drive the front wheels 1 faster than the rear wheels 2, with the left cylinder 13L contracted to operate the left side brake 11L.

This agricultural tractor includes a switching structure operable in response to positions of the auxiliary transmission 4b mounted in the transmission case 4, for selectively allowing and prohibiting the above automatic operation of the side brakes 11R and 11L and shift of the front wheel transmission 6 to the accelerating position. This switching structure will be described next.

Figure 4:
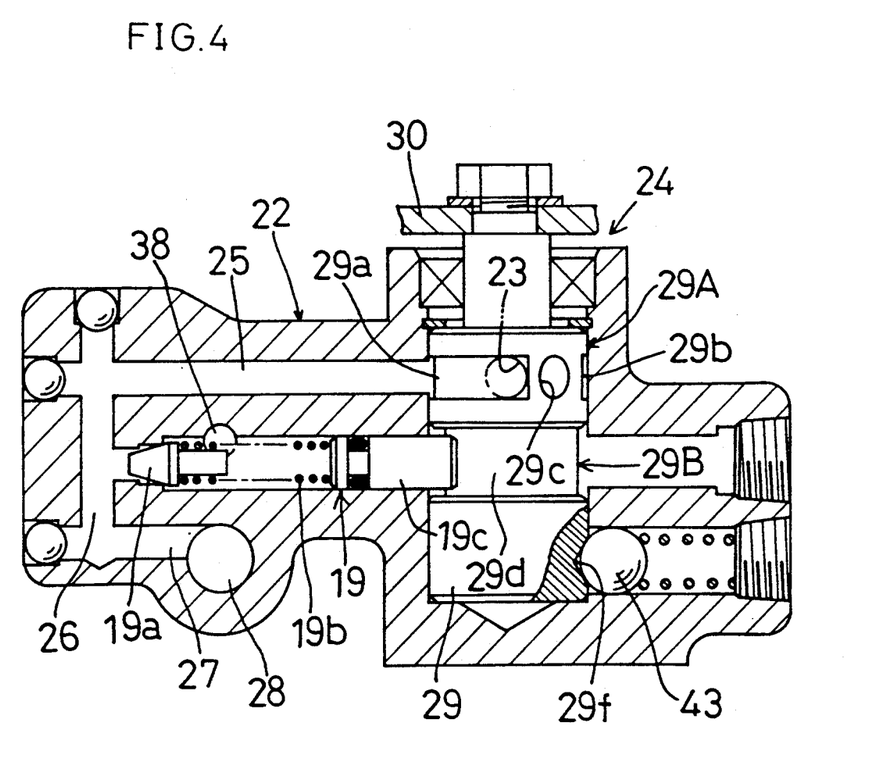
FIG. 4 is a section taken on line C—C of FIG. 3 and seen in an upward direction of FIG. 3.

As shown in FIGS. 2 through 4, pressure oil is supplied from the pump 15 to the control valve 16 through an oil line 23, a rotary type changeover valve 24, and oil lines 25, 26, 27 and 28.

As shown in FIGS. 3 and 4, a pressure governor valve 19 is connected to the oil line 26. The pressure governor valve 19 includes a valve closure member 19a, a spring 19b for biasing the valve closure member 19a to a valve closing position, and a bearing 19c for supporting a rear end of the spring 19b. When a pressure in the oil line 26 exceeds a pressure determined by the spring 19b, the valve closure member 19a moves rightward in the drawings to an open position to drain the pressure oil through a drain oil line 38. Thus, the biasing force of the spring 19b, that is a position of the bearing 19c, of the pressure governor valve 19 determines an oil pressure supplied to the control valve 16.

Figure 5:
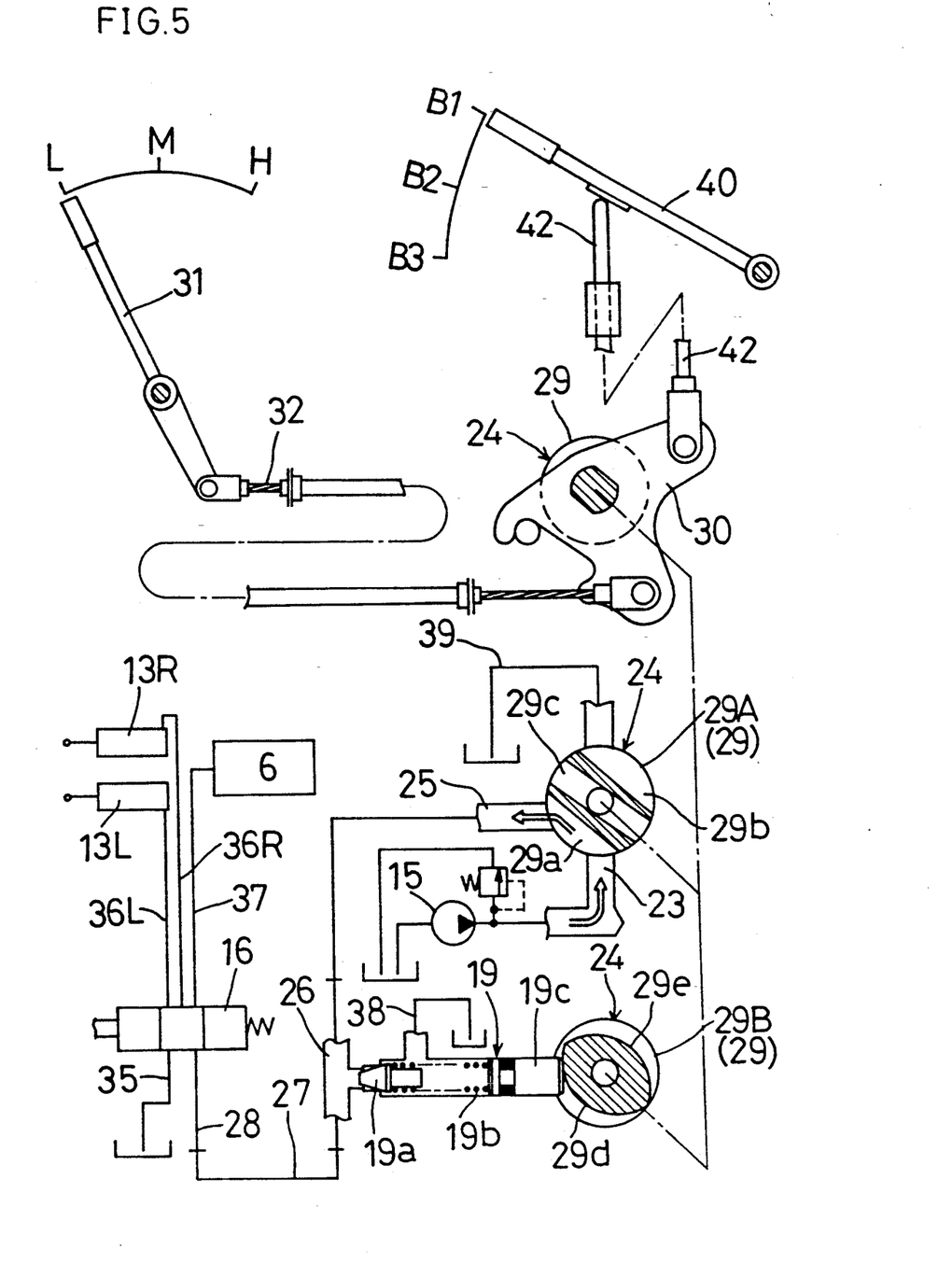
FIG. 5 is a view showing positions of the changeover valve and pressure governor valve when a shift lever is in a low speed position.

As shown in FIG. 3 through 5, the changeover valve 24 has a spool 29 including a first land 29A and a second land 29B. The first land 29A defines a pair of cutouts 29a and 29b and a drain bore 29c. The second land 29B defines a first arcuate surface 29d and a second arcuate surface 29e. The first arcuate surface 29d contacts a rear end of the bearing 19c of the pressure governor valve 19 to determine the position of the bearing 19c. The spool 29 further includes three recesses 29f formed in a rear end thereof for receiving a detent ball 43 mounted in the valve unit 22, to maintain the spool 29 in the three positions shown in FIGS. 5, 6 and 7 as described later. As shown in FIGS. 4 and 5, the spool 29 carries a control plate 30 fixedly mounted on a forward end thereof projecting from the valve unit 22. The control plate 30 is connected to a shift lever 31 of the auxiliary transmission 4b through a wire 32. Further, the spool 29 is biased counterclockwise in the drawings by a spring (not shown). This spring has a biasing force stronger than a biasing force of the spring 19b and a retaining force of the detent ball 43.

FIGS. 3 and 5 show a state in which the shift lever 31 is operated to a low speed position L. In this state, pressure oil is supplied from the pump 15 to the control valve 16 through the oil line 23, the first cutout 29a of the changeover valve 24, and the oil lines 25, 26, 27 and 28. The bearing 19c of the pressure governor valve 19 is pushed leftward in the drawings by the first arcuate surface 29d of the spool 29. As a result, the spring 19b of the pressure governor valve 19 is compressed, whereby the pressure governor valve 19 maintains the oil pressure supplied to the control valve 16 at a second set pressure P2.

Figure 9:
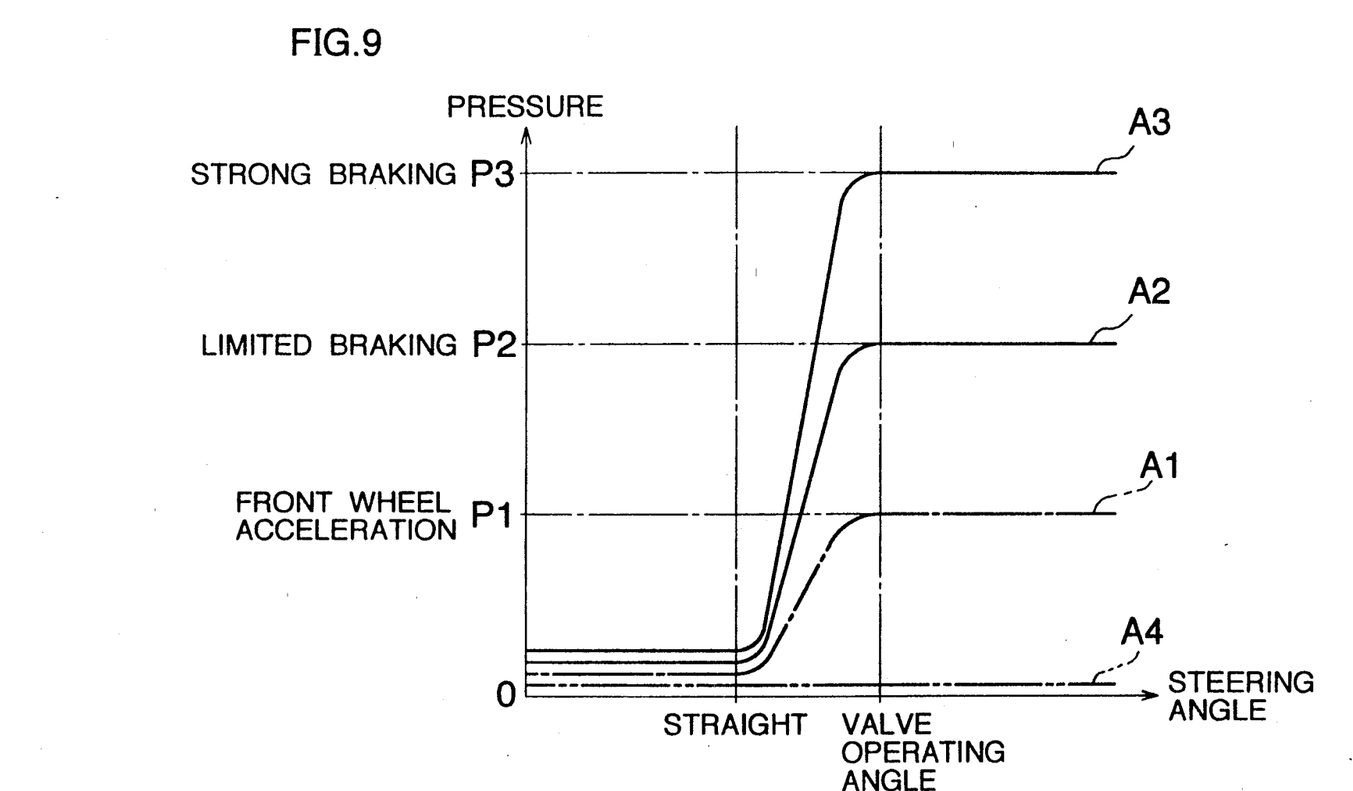
FIG. 9 is a view showing relations between positions of the shift lever and three set pressures, i.e. the first set pressure for switching the front wheel transmission to an accelerating position, the second set pressure for switching the front wheel transmission to the accelerating position and causing one of the side brakes to apply a limited braking force, and the third position for switching the front wheel transmission to the accelerating position and causing one of the side brakes to apply a strong braking force.

As shown in FIG. 9, the front wheel transmission 6 is switchable from the standard position to the accelerating position under a relatively low, first set pressure P1. However, the side brakes 11R and 11L are not operable under the first set pressure P1. Under the second set pressure P2 higher than the first set pressure P1, the side brakes 11R and 11L are operable to apply a limited braking force, and the front wheel transmission 6 is switchable from the standard position to the accelerating position. When one of the side brakes 11R and 11L applies the limited braking force, the braked rear wheel 2 is rotated by a dragging force of the moving tractor overcoming that braking force.

When the front wheels 1 are steered in excess of the predetermined angle rightward or leftward with the shift lever 31 operated to the low speed position L as shown in FIGS. 3 and 5, the cam plate 18 slides the spool 16a of the control valve 16. As a result, pressure oil is supplied from the oil line 28 to the right or left cylinder 13R or 13L through the right or left brake port 36R or 36L, and to the front wheel transmission 6 through the front wheel transmission port 37.

At this time, the pressure oil supplied is maintained at the second set pressure P2 by the action of the pressure governor valve 19. Consequently, as shown in a solid line A2 in FIG. 9 and in the table of FIG. 10, the friction clutch 21 of the front wheel transmission 6 is engaged to provide the accelerating position to drive the front wheels 1 faster than the rear wheels 2, and the right or left cylinder 13R or 13L is contracted to cause the right or left side brake 11R or 11L to apply the limited braking force. Then the tractor is capable of making a very small, sharp turn by the pulling action in a turning direction of the accelerated front wheels 1 and by the braking action applied to the inward rear wheel 2. When the braked inward rear wheel 2 is dragged with turning of the tractor, this rear wheel 2 is rotated to leave little injury on the ground.

Figure 6:
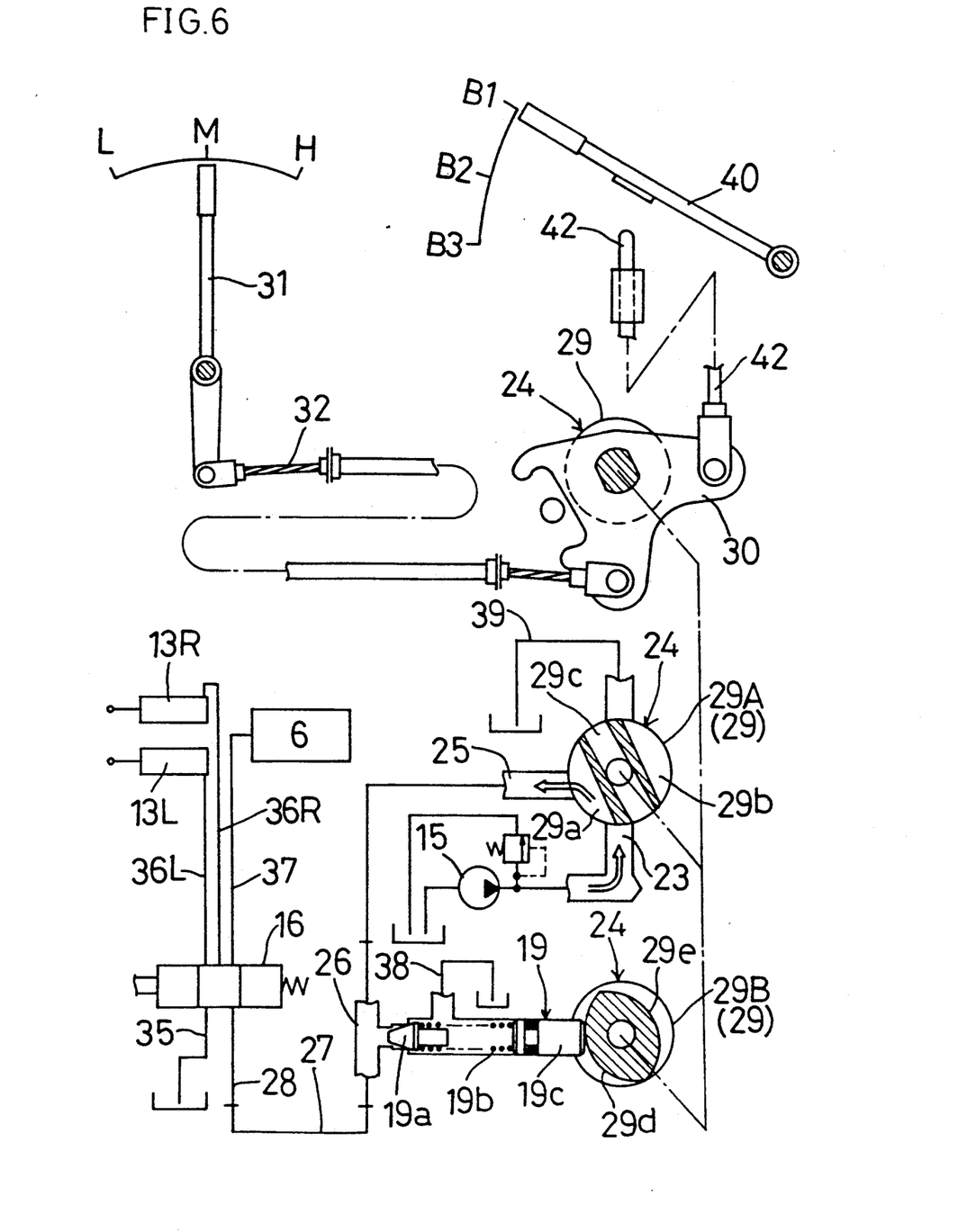
FIG. 6 is a view showing positions of the changeover valve and pressure governor valve when a shift lever is in an intermediate speed position.

When the shift lever 31 is operated to an intermediate speed position M as shown in FIG. 6, the spool 29 of the changeover valve 24 is rotated a predetermined angle clockwise from the position shown in FIG. 5 to the position shown in FIG. 6. In this case, the position of the first arcuate surface 29d of the spool 29 contacting the bearing 19c of the pressure governor valve 19 is slightly retracted rightward in FIG. 6. As a result, the bearing 19c also slides rightward to slightly diminish the biasing force of the spring 19b, whereby the pressure oil supplied to the control valve 16 is maintained at the first set pressure P1 lower than the second set pressure P2.

Figure 10:
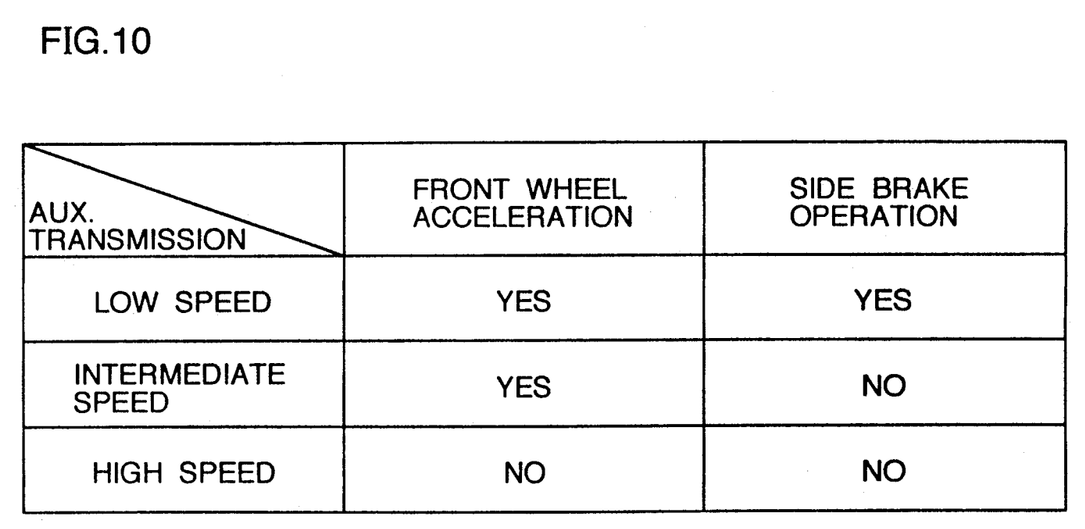
FIG. 10 is a table showing relations between the positions of the shift lever and two states, i.e. one state where the front wheel transmission is switchable to the accelerating position, and the other state where either side brake is operable to apply a braking force.

Thus, when, in this state, the front wheels 1 are steered in excess of the predetermined angle rightward or leftward and pressure oil is supplied from the oil line 28 to the right or left cylinder 13R or 13L, the friction clutch 21 of the front wheel transmission 6 is engaged to provide the accelerating position to drive the front wheels 1 faster than the rear wheels 2 as shown in a dot-and-dash line A1 in FIG. 9 and in the table of FIG. 10. On the other hand, the right or left cylinder 13R or 13L is not contracted and thus the right or left side brake 11R or 11L is not operated. Then the tractor makes a smooth small turn only by the pulling action in a turning direction of the accelerated front wheels 1. Since both the right and left rear wheels 2 are driven, the inward rear wheel 2 with respect to turning of the tractor is not dragged, and thus no injury is made to the ground.

Figure 7:
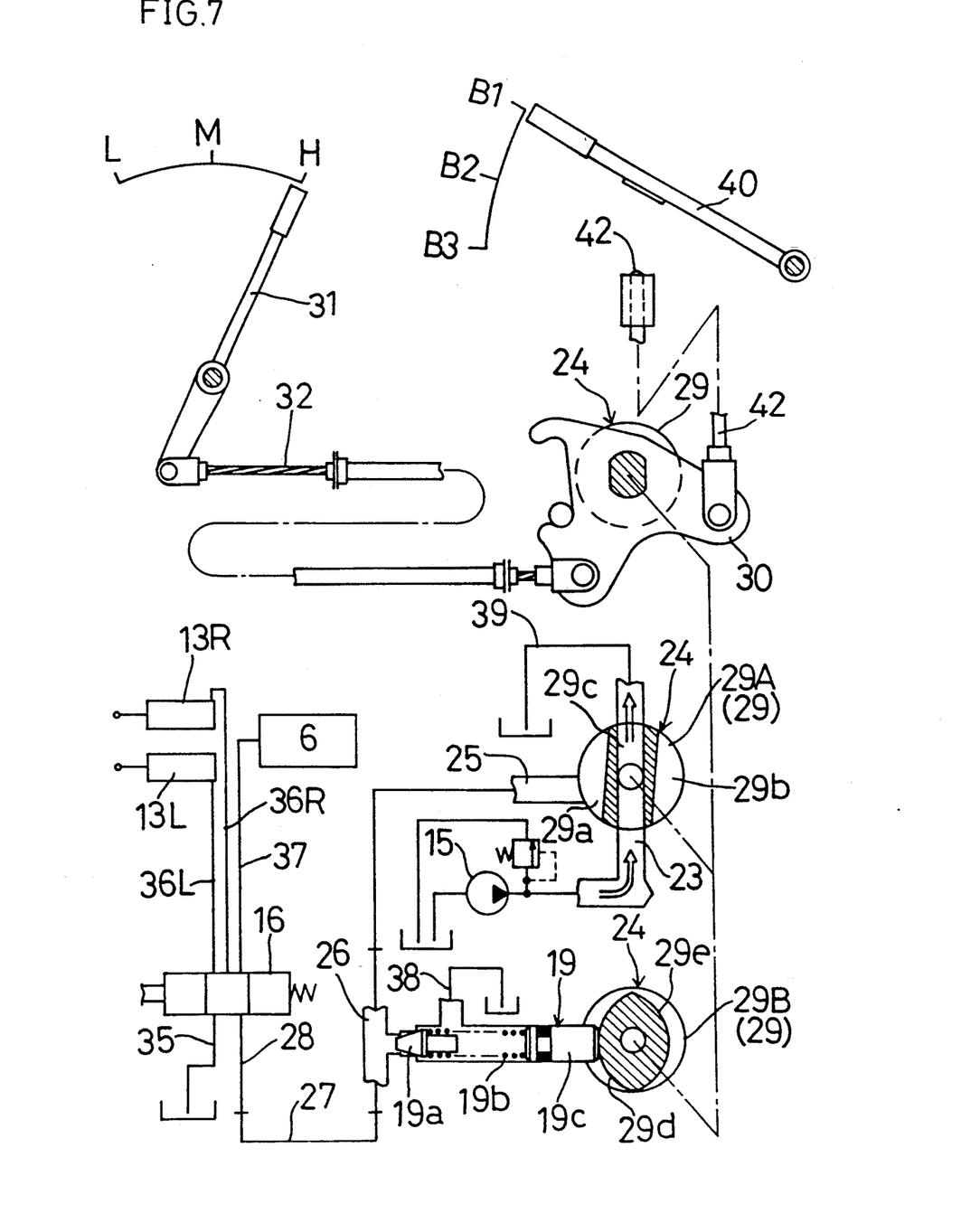
FIG. 7 is a view showing positions of the changeover valve and pressure governor valve when a shift lever is in a high speed position.

When the shift lever 31 is operated to a high speed position H as shown in FIG. 7, the spool 29 of the changeover valve 24 is further rotated a predetermined angle clockwise from the position shown in FIG. 6 to the position shown in FIG. 7. In this case, the drain bore 29c in the first land 29A of the spool 29 communicates with a drain oil line 39 (which communicates with the drain 35 in FIG. 3). As a result, the pressure oil from the pump 15 is drained through the oil line 23, the drain bore 29c in the first land 29A, and the drain oil line 39.

Thus, even in this state, the front wheels 1 are steered in excess of the predetermined angle rightward or leftward, no pressure oil is supplied to the right or left cylinder 13R or 13L, or to the front wheel transmission 6 as shown in a two-dot-and-dash line A4 in FIG. 9 and in the table of FIG. 10. Consequently, the tractor makes a turn with the front wheel transmission 6 maintained in the standard position, and the right or left side brake 11R or 11L not operated. The turn is made with the front wheels 1 and rear wheels 2 driven at substantially the same speed.

In the above construction, the three states of the front wheel transmission 6 and side brakes 11R and 11L are selected in response to positions of the auxiliary transmission 4b. This agricultural tractor is capable of selecting the above three states through a switch lever 40. As shown in FIG. 5, the switch lever 40 is disposed at the righthand side of a steering wheel 41 (FIG. 1) to be operable to and retainable in a first position B1, a second position B2 and a third position B3. A control rod 42 is connected to the control plate 30 fixed to the spool 29 of the changeover valve 24. This control rod 42 has an upper end contacting a lower surface of the switch lever 40.

FIG. 5 shows the switch lever 40 in the first position B1. In this position, one of the three states is selected according the position of the shift lever 31 of the auxiliary transmission 4b when the tractor makes a turn. These three states comprise the state in which the front wheel transmission 6 is switched to the accelerating position, and one of the side brakes 11R and 11L inward with respect to turning of the tractor is operated to apply the limited braking force (see the solid line A2 in FIG. 9 and the table of FIG. 10), the state in which the front wheel transmission 6 is switched to the accelerating position, and neither of the side brakes 11R and 11L is operated (see the dot-and-dash line A1 in FIG. 9 and the table of FIG. 10), and the state in which the front wheel transmission 6 is maintained in the standard position, and neither of the side brakes 11R and 11L is operated (see the two-dot-and-dash line A4 in FIG. 9 and the table of FIG. 10).

When, in the state shown in FIG. 5, the switch lever 40 is operated to the second position B2, the control plate 30 is rotated a predetermined angle clockwise, thereby rotating the spool 29 of the changeover valve 24 to the angle shown in FIG. 6. As a result, when the shift lever 31 is operated to the low speed position L to make a turn, the front wheel transmission 6 is switchable to the accelerating position but the side brake 11R or 11L is not operable as when the shift lever 31 is in the intermediate speed position M. When the shift lever 31 is operated to the high speed position H to make a turn, the front wheel transmission 6 is maintained in the standard position, and neither of the side brakes 11R and 11L is operated. When the switch lever 40 is operated to the third position B3, the control plate 30 is further rotated clockwise, thereby rotating the spool 29 of the changeover valve 24 to the angle shown in FIG. 7. As a result, even when the shift lever 31 is operated to the low speed position L or intermediate speed position M to make a turn, the front wheel transmission 6 is not switchable to the accelerating position, nor is the side brake 11R or 11L operable.

In the above construction, one of the side brakes 11R and 11L inward with respect to turning of the tractor is operated to apply the limited braking force, with the shift lever 31 in the low speed position L and the switch lever 40 in the first position B1. This agricultural tractor is also capable of switching the side brake 11R or 11L inward with respect to turning of the tractor for applying a strong braking force. As shown in FIG. 5, the second land 29B of the spool 29 of the changeover valve 24 defines a second arcuate surface 29e on the opposite side of the first arcuate surface 29d. For producing a strong braking condition of the side brakes 11R and 11L at a time of turning the tractor, the spool 29 is pulled out of the valve unit 22, turned 180 degrees, and pushed back into the valve unit 22. The second arcuate surface 29e of the spool 29 now contacts the bearing 19c of the pressure governor valve 19 as shown in FIG. 8.

Figure 8:
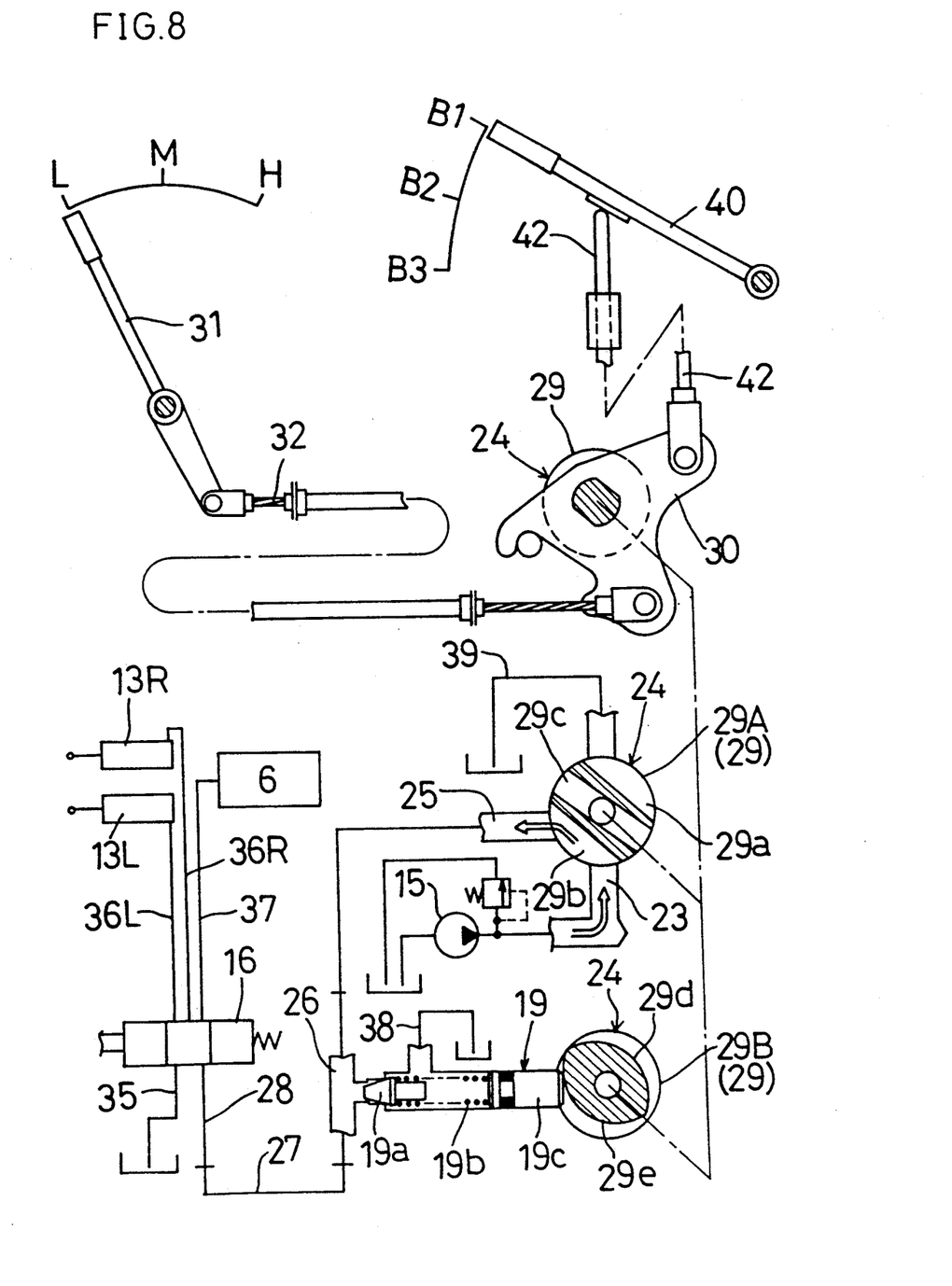
FIG. 8 is a view showing positions of the changeover valve and pressure governor valve, with the changeover valve turned 180 degrees from the position shown in FIG. 5.

The second arcuate surface 29e in the angular position of the spool 29 shown in FIG. 8 lies more leftward than the first arcuate surface 29d shown in FIG. 5.

Thus, the bearing 19c of the pressure governor valve 19 is pushed further leftward from the position shown in FIG. 4. Consequently, the spring 19b of the pressure governor valve 19 is further compressed from the position shown in FIG. 4, whereby the pressure governor valve 19 maintains the oil pressure supplied to the control valve 16 at a third set pressure P3 which is higher than the second set pressure P2. The spool 29 defines another three recesses (not shown) in a surface thereof 180 degrees opposite from the recess 29f shown in FIG. 4, for receiving the detent ball 43 in the valve unit 22 to retain positions of the spool 29.

When the front wheels 1 are steered in excess of the predetermined angle from the position shown in FIG. 8 (with the shift level 31 in the low speed position L and the switch lever 40 in the first position B1), the friction clutch 21 of the front wheel transmission 6 is engaged to provide the accelerating position to drive the front wheels 1 faster than the rear wheels 2, and the right or left cylinder 13R or 13L is contracted to cause the right or left side brake 11R or 11L to apply the strong braking force as shown in a solid line A3 in FIG. 9 and in the table of FIG. 10. Then the tractor is capable of making a very small, sharp turn by the pulling action in a turning direction of the accelerated front wheels 1 and by the strong braking action applied to the inward rear wheel 2.

Since the side brake 11R or 11L inward with respect to the turning of the tractor applies the strong braking force, the braked inward rear wheel 2 is dragged with turning of the tractor without rotating. Thus, the tractor is capable of making a smaller turn than the turn shown in the solid line A2 in FIG. 9.

When, in the state shown in FIG. 8, the shift lever 31 is operated to the intermediate speed position M, the front wheel transmission 6 is switched to the accelerating position with turning of the tractor, but the side brake 11R or 11L is not operated (see the dot-and-dash line in FIG. 9 and the table of FIG. 10). When the shift lever 31 is operated to the high speed position H, the front wheel transmission 6 is not switchable to the accelerating position, nor is the side brake 11R or 11L operable (see the two-dot-and-dash line in FIG. 9 and the table of FIG. 10).

When the switch lever 40 is operated to the first position B1, one of the three stages is selected according the position of the shift lever 31 of the auxiliary transmission 4b when the tractor makes a turn, as noted hereinbefore. These three states comprise the state in which the front wheel transmission 6 is switched to the accelerating position, and one of the side brakes 11R and 11L inward with respect to turning of the tractor is operated to apply the strong braking force (see the solid line A3 in FIG. 9 and the table of FIG. 10), the state in which the front wheel transmission 6 is switched to the accelerating position, and neither of the side brakes 11R and 11L is operated (see the dot-and-dash line A1 in FIG. 9 and the table of FIG. 10), and the state in which the front wheel transmission 6 is maintained in the standard position, and neither of the side brakes 11R and 11L is operated (see the two-dot-and-dash line A4 in FIG. 9 and the table of FIG. 10).

When, in the state shown in FIG. 8, the switch lever 40 is operated to the second position B2, and the shift lever 31 is operated to the low speed position L to make a turn, the front wheel transmission 6 is switchable to the accelerating position but the side brake 11R or 11L is not operable as when the shift lever 31 is in the intermediate speed position M. When the shift lever 31 is operated to the high speed position H to make a turn, the front wheel transmission 6 is maintained in the standard position, and neither of the side brakes 11R and 11L is operated. When the switch lever 40 is operated to the third position B3, and the shift lever 31 is operated to the low speed position L or intermediate speed position M to make a turn, the front wheel transmission 6 is maintained in the standard position, and neither of the side brakes 11R and 11L is operated as when the shift lever 31 is in the high speed position M.

The foregoing embodiment may be modified in various ways within the scope of the present invention. For example, while the control valve 16, changeover valve 24 and pressure governor valve 19 are all mechanically operable in the foregoing embodiment, the control valve 16 and changeover valve 24 may be adapted electromagnetically operable and the pressure governor valve 19 may comprise an electromagnetic proportional pressure reducing valve. In the foregoing embodiment, the single control valve 16 operates the front wheel transmission 6 and side brakes 11R and 11L. The pressure control by the pressure governor valve 19 effects a selection among the state in which the front wheel transmission 6 is switched to the accelerating position, and one of the side brakes 11R and 11L inward with respect to turning of the tractor is operated, the state in which the front wheel transmission 6 is switched to the accelerating position, and neither of the side brakes 11R and 11L is operated, and the state in which the front wheel transmission 6 is maintained in the standard position, and neither of the side brakes 11R and 11L is operated. Separate control valves may be provided for the front wheel transmission 6 and for the side brakes 11R and 11L, which control valves are mechanically governed by stoppers or the like in response to positions of the propelling transmission. Further, a selection is made among the three states in response to the positions of the auxiliary transmission that provides three, high, intermediate and low, speeds in the foregoing embodiment. The auxiliary transmission may provide six speeds, with the sixth and fifth speeds forming a high speed range, the fourth and third speeds forming an intermediate speed range, and the second and first speeds forming a low speed range, and the selection being based on the three speed ranges.

What is claimed is:

1. A four wheel drive working vehicle comprising:
   right and left front wheels, and right and left rear wheels:
   a propelling transmission for outputting variable drive to said front wheels and said rear wheels;
   a front wheel transmission disposed between said front wheels and said propelling transmission, said front wheel transmission including a switching actuator for switching said front wheel transmission between a standard position for driving said front wheels at substantially the same speed as said rear wheels, and an accelerating position for driving said front wheels at a higher speed than said rear wheels;
   right and left side brakes for acting on said right and left rear wheels, respectively;
   right and left actuators for driving said right and left side brakes, respectively;
   steering means for steering said front wheels;
   a hydraulic control valve for controlling said switching actuator and said right and left actuators; and interlock means for transmitting a displacement of said steering means to a spool of said hydraulic control valve;

wherein said control valve is operable, in response to a displacement of said steering means exceeding a first set angle, to switch said front wheel transmission from said standard position to said accelerating position, and in response to a further displacement of said steering means exceeding a second set angle, to control one of said right and left actuators to drive one of said right and left side brakes inwardly with respect to turning of said working vehicle.

2. A four wheel drive working vehicle as claimed in claim 1, wherein said first set angle and said second set angle are the same.

3. A four wheel drive working vehicle as claimed in claim 1, further comprising governor means for setting a pressure of oil supplied to said control valve based on a running speed of said working vehicle.

4. A four wheel drive working vehicle comprising:
right and left front wheels, and right and left rear wheels;
a propelling transmission for outputting variable drive to said front wheels and said rear wheels;
a front wheel transmission disposed between said front wheels and said propelling transmission, said front wheel transmission including a switching actuator for switching said front wheel transmission between a standard position for driving said front wheels at substantially the same speed as said rear wheels, and an accelerating position for driving said front wheels at a higher speed than said rear wheels;
right and left side brakes for acting on said right and left rear wheels, respectively;
right and left actuators for driving said right and left side brakes, respectively;
steering means for steering said front wheels;
control means including a first control unit for controlling said front wheel transmission, and a second control unit for controlling said right and left actuators;
interlock means for transmitting a displacement of said steering means to said control means;
said first control unit being operable, in response to a displacement of said steering means exceeding a first set angle, to switch said front wheel transmission from said standard position to said accelerating position;
said second control unit being operable, in response to a further displacement of said steering means exceeding a second set angle, to control one of said right and left actuators to drive one of said right and left side brakes inwardly with respect to turning of said working vehicle; and
governor means for governing operation of said control means, said governor means including a first governor section for prohibiting operation of said first and second control units when said propelling transmission is set to a high speed position, a second governor section for allowing operation of said first control unit and prohibiting operation of said second control unit when said propelling transmission is set to an intermediate speed position, and a third governor section for allowing operation of said first and second control units when said propelling transmission is set to a low speed position.

5. A four wheel drive working vehicle as claimed in claim 4, wherein said first set angle and said second set angle are the same.

6. A four wheel drive working vehicle as claimed in claim 5, wherein said right and left actuators and said switching actuator are hydraulic actuators, said right and left actuators having a greater operating pressure than said switching actuator, wherein said control means comprises a hydraulic valve having a spool operable by said interlock means, and wherein said governor means is pressure control means mounted on an oil supply line extending to said hydraulic valve for setting pressure values in response to the positions of said propelling transmission.

* * * * *